United States Patent [19]

Linhart

[11] 3,818,100

[45] June 18, 1974

[54] CONTROL OF VAMPIRE BATS

[75] Inventor: Samuel B. Linhart, Golden, Colo.

[73] Assignee: The United States of America as represented by the Secretary of the Interior, Washington, D.C.

[22] Filed: Apr. 24, 1972

[21] Appl. No.: 247,179

[52] U.S. Cl.............................. 424/281, 424/331
[51] Int. Cl. ......................... A01n 9/24, A01n 9/28
[58] Field of Search ......... 424/281, 331, 17; 167/84

[56] References Cited
UNITED STATES PATENTS
2,754,302   7/1956   Gyson et al. ..................... 424/17
3,113,071   12/1963   Derse et al. ..................... 424/17

FOREIGN PATENTS OR APPLICATIONS
1,082,772   9/1967   Great Britain ..................... 424/281

OTHER PUBLICATIONS

Merrill; Control of Opossums, Bats, Raccoons, and Skunks; Vertebrate Pest Control Conference; Sacramento, Calif., received 1/5/66 pp 79, 82–87. Jones, Pests 16, No. 12, 7–8 (1948).

Primary Examiner—Albert T. Meyers
Assistant Examiner—Allen J. Robinson
Attorney, Agent, or Firm—William S. Brown; Frank A. Lukasik

[57] ABSTRACT

Control of vampire bats is accomplished by capture of individual bats, application of a slow-acting toxicant to the bodies of the individuals, and subsequent release of the treated bats. After release, the bats return to their roosting sites where the toxicant is spread to other vampires, resulting in death of a large percentage of the bats.

1 Claim, No Drawings

CONTROL OF VAMPIRE BATS

An estimated one million head of cattle die annually from rabies transmitted by vampire bats, whose range extends from northern Argentina to tropical Mexico. Effective and economical methods are, therefore, needed to reduce vampire bat populations in areas where bat-borne rabies is a problem.

Control of vampire bats presents unusual problems. The animals are nocturnal, highly mobile, and their roosts are frequently located in rugged and heavily vegetated terrain. Because they feed exclusively on the fresh blood of live birds and mammals, conventional control techniques cannot be used, and they rarely concentrate at feeding sites in large enough numbers to make trapping or netting effective as a widespread control measure. They normally roost in numerous scattered sites, most of which are hard to locate and contain relatively few vampire bats (for common vampires, usually 10–200 per site in cave-type roosts, 5–50 in tree roosts). In addition, they may frequently move from roost to roost and commonly share their roosts with beneficial species of bats. Thus, selective control within the roost is difficult even when their refuges are found.

However, certain behavioral characteristics of the common vampire bat, *Desmodus rotundus*, have been observed: (a) The bats groom themselves intensively, spending as much as 2 to 3 hours a day in this activity. In grooming, they characteristically scratch the body with a hind foot, inserting the foot into the mouth about every 5 to 10 seconds. Wing membranes and thumbs are also cleaned with the tongue. (b) The bats use the same small niches within their roosts for extended periods of time. They roost very close together and body contact is normal between vampires sharing the same roosting site. (c) The vampires do not share the same niche with other bat species. (d) Although it is very difficult to capture the entire vampire bat population in a given area, small numbers may be easily captured at specific feeding sites.

It has now been found, in accordance with the present invention, that the above characteristics make possible an efficient and economical means for reducing the vampire bat populations. This is achieved by a method comprising initial capture of a relatively small number of the bats, application of a slow-acting toxicant to the bodies of the individual captured bats and subsequent release of the thus-treated individuals.

Initial capture of the bats may be readily achieved by means of mist nets placed around tethered or corralled cattle. Other conventional capture methods, such as the use of traps or nets at roost sites, may also be employed. The optimum number of bats captured, and treated according to the method of the invention, will depend on the total numbers of bats to be controlled, the number of roosts present in the area, and the severity of vampire predation. Generally, however, capture and treatment of about 10 to 20 individuals will be sufficient to reduce a vampire population of about 200 to 400 by as much as 90 to 100 percent. Capture of the vampire bats at feeding sites must be accomplished at night since the animals are nocturnal feeders.

The toxicant employed should be relatively slow-acting to permit transfer of toxicant from the treated animals to a substantial number of untreated vampires using the same roosting site. For this purpose, anticoagulants, such as chlorophacinone, i.e., 2-(parachlorophenyl)phenylacetyl-1, 3-indandione, and diphenadione, i.e., 2-diphenylacetyl-1,3-indandione (U.S. patent 2,672,483), have been found to be particularly effective. However, other anticoagulants such as warfarin, i.e., 3-($\alpha$-acetonylbenzyl)-4-hydroxycoumarin, Tomorin, i.e., 3-($\alpha$-acetonyl-4-chlorobenzyl)-4-hydroxycoumarin and Fumarin, i.e., 3-($\alpha$-acetonylfurfuryl)-4-hydroxycoumarin, can also be used.

A carrier will generally be employed for application of the toxicant to the captured bats. This should be a material that adheres well to the body of the bat, is easily transferred by contact to other bats, and is ingested by the bats while grooming. Suitable carriers include petroleum jelly, (e.g., Vaseline), acetone, and a mixture of mineral oil, rosin and polyethylene. Of these, petroleum jelly has been found to be particularly effective since it adheres well to the fur of the bats, but is easily transferred and ingested by the bats.

The optimum amount of toxicant applied to each captured bat will vary with the anticoagulant activity of the compound and the type of carrier used. However, about 10 to 100 milligrams is generally a suitable amount. In the case of the preferred toxicants, chlorophacinone and diphenadione, an amount of about 50 milligrams per treated bat has been found to give good results.

The amount of carrier will also vary with the above-mentioned factors, but will generally range from about 1.0 to 3.0 ml. In the case of the preferred carrier, petroleum jelly, an amount of about 1.5 ml has been found to give very good results. The toxicant-carrier composition is generally prepared simply by mixing the two materials in any conventional manner, as by stirring. However, if the carrier is a highly viscous material, such as petroleum jelly, it may be necessary to heat it sufficiently to reduce the viscosity enough to permit mixing. The composition is then allowed to cool before application to the bat.

The toxicant-carrier composition is then applied to the body of the bat by any conventional means such as by the use of a spatula, brush or other simple applicator. It has been found that application of the composition to the back of the animal, with fairly uniform spreading of the composition on the skin and hair, results in satisfactory spreading of the toxicant and ingestion by other vampires.

The thus-treated vampires are then released and permitted to return to their roosts where body contact between individuals and subsequent grooming results in spreading and ingestion of the toxicant by other bats. Release of the bats should take place well before dawn, since vampires released at sunrise or during daylight hours seek the nearest dark refuge and probably do not return to their normal roosting site until darkness. Furthermore, release during daylight hours may result in harassment by birds.

Although the method of the invention has been found very effective in control of vampires, certain precautions should be exercised in using the method. Care should be taken to avoid treatment of non-vampire species, since bats as a group are highly beneficial in insect control, pollination, etc. Accordingly, the bats to be treated should be clearly identified as vampires. Also, the method should not be employed in areas where vampires roost in wells due to the possibility of contamination of the well water.

The invention will be more specifically illustrated by the following examples.

EXAMPLE 1

In this example, vampires from a cave of known (approximately) bat population were treated according to the method of the invention, released back into the cave and the results observed. The cave was approximately 150 × 3–30 × 0.5–6 meters and contained a large Desmodus colony estimated at about 2000 individuals located in two roosting sites. In addition, several hundred thousand other bats, including *Pteronotus davyi*, *P. psilotis*, *P. rubiginosa*, *Glossophaga soricina* and *Macrotus waterhousii*, were present.

90 Desmodus were captured in a mist net placed at the cave entrance shortly after dark. 1.5 ml of a paste consisting of Vaseline containing 50 mg of chlorophacinone was then applied with a spatula to each of the captured bats which were then released back into the cave.

Eight days later the results were determined. An estimated 2,000 dead vampires were recovered from throughout the cave, the ratio of treated to total dead vampires therefore being about 1:22. No dead bats other than Desmodus were found.

EXAMPLE 2

In this example, vampires were captured at a feeding site, treated with toxicant, and released to return to their roosting places. Capture and treatment of the vampires took place on a ranch having a fenced pasture containing about 140 Zebu cows and calves that were subjected nightly to moderate vampire attack. The type and amount of chlorophacinone paste employed in treating the vampires was the same as that used in example 1.

Cattle were corralled early in the morning, the location and number of fresh vampire bites on each animal were recorded, and all animals were returned to pasture. The same animals were corralled again in late afternoon, and the corral was surrounded by about 100 linear meters of 2-meter-high mist netting. All vampires caught during the night were caged, banded, treated with the chlorophacinone paste, and released at least ¾ hour before dawn.

Fifteen days after treatment the cattle were again corralled, bite counts were made, mist nets were erected, and all vampires caught were banded and released. Results of these tests are shown in the following table. It will be seen that the number of bites and the number of vampire bats netted were reduced 90 percent or more.

|  |  | Before treatment | After treatment |
|---|---|---|---|
| No. of cattle examined: | Adults | 71 | 67 |
|  | Calves | 46 | 62 |
| No. of fresh vampire bites: | Adults | 16 | 1 |
|  | Calves | 53 | 0 |
| Average no. of bites/animal: | Adults | 0.2 | 0.02 |
|  | Calves | 1.2 | 0 |
| No. of vampires netted: |  | 57 | 3 |
| N0. of vampires treated and released: |  | 54 | — |
| % reduction in vampire bites: | Adults | — | 93.6 |
|  | Calves | — | 100 |
| % reduction in vampires netted: |  | — | 94.7 |

I claim:

1. A method for controlling vampire bat populations comprising: (1) Capturing, at night, one or more individual vampires, (2) applying an anticoagulant-carrier composition to the back of said individuals by means of a spatula or brush, said anticoagulant being selected from the group consisting of 2-(parachlorophenyl)phenylacetyl-1,3-indandione, 2-diphenylacetyl-1,3-indandione, 3-(α-acetonylbenzyl)-4-hydroxycoumarin, 3-(α-acetonyl-4-chlorobenzyl)-4-hydroxycoumarin and 3-(α-acetonylfurfuryl)-4-hydroxycoumarin and said carrier being selected from the group consisting of petroleum jelly, acetone and a mixture of mineral oil, rosin and polyethylene, said anticoagulent being employed in an amount of about 10 to 100 milligrams per individual vampire and the carrier being employed in an amount of about 1.0 to 3.0 ml per individual and (3) releasing the thus-treated individuals before dawn, whereby the vampires return to their roosting sites where the anticoagulant is spread to other vampires, resulting in the death of a large percentage of said vampires.

* * * * *